United States Patent
Nakano et al.

(10) Patent No.: US 10,599,977 B2
(45) Date of Patent: Mar. 24, 2020

(54) CASCADED NEURAL NETWORKS USING TEST OUPUT FROM THE FIRST NEURAL NETWORK TO TRAIN THE SECOND NEURAL NETWORK

(71) Applicant: International Business Machines Corporation, Armonk, NY (US)

(72) Inventors: Hiroki Nakano, Shiga (JP); Masaharu Sakamoto, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 15/244,109

(22) Filed: Aug. 23, 2016

(65) Prior Publication Data
US 2018/0060723 A1 Mar. 1, 2018

(51) Int. Cl.
*G06N 3/04* (2006.01)
*G06T 7/00* (2017.01)

(52) U.S. Cl.
CPC ......... *G06N 3/0454* (2013.01); *G06T 7/0012* (2013.01); *G06T 2200/04* (2013.01); *G06T 2207/10081* (2013.01); *G06T 2207/10088* (2013.01); *G06T 2207/20081* (2013.01); *G06T 2207/20084* (2013.01); *G06T 2207/30061* (2013.01); *G06T 2207/30096* (2013.01)

(58) Field of Classification Search
None
See application file for complete search history.

(56) References Cited

U.S. PATENT DOCUMENTS

| | | |
|---|---|---|
| 8,126,267 B2 | 2/2012 | Talati et al. |
| 8,811,697 B2 | 8/2014 | Sofka et al. |
| 2015/0095017 A1 | 4/2015 | Mnih et al. |
| 2015/0213302 A1 | 7/2015 | Madabhushi et al. |
| 2016/0026851 A1 | 1/2016 | Divekar et al. |
| 2016/0157831 A1 | 6/2016 | Kang et al. |
| 2016/0180162 A1 | 6/2016 | Cetintas et al. |
| 2019/0012768 A1* | 1/2019 | Tafazoli Bilandi ....... G06T 7/50 |

FOREIGN PATENT DOCUMENTS

| | | |
|---|---|---|
| CN | 103824049 A | 5/2014 |
| CN | 105631519 A | 6/2016 |
| CN | 106056210 A | 10/2016 |
| JP | 10171910 A | 6/1998 |

(Continued)

OTHER PUBLICATIONS

Qin et al. "Joint Training of Cascaded CNN for Face Detection". IEEE CVPR, Jun. 2016, pp. 3456-3465.*

(Continued)

*Primary Examiner* — Li Wu Chang
(74) *Attorney, Agent, or Firm* — North Shore Patents, P.C.; Michele Liu Baillie

(57) ABSTRACT

A method includes: training a first neural network using a first training dataset; inputting each test data of a first test dataset to the first neural network; calculating output data of the first neural network for each test data of the first test dataset; composing a second training dataset of training data from the first test dataset that causes the first neural network to output data within a first range; and training a second neural network using the second training dataset.

20 Claims, 8 Drawing Sheets

(56) References Cited

FOREIGN PATENT DOCUMENTS

| JP | 2014049118 A | 3/2014 |
|---|---|---|
| WO | 2014075017 A1 | 5/2014 |

OTHER PUBLICATIONS

Cancer Research UK, http://www.cancerresearchuk.org/health-professional/cancer-statistics/statistics-by-cancer-type/lung-can\cer/mortality, retrieved Jun. 24, 2016.

Setio, A.A.A. et al., "Pulmonary Nodule Detection in CT Images: False Positive Reduction Using Multi-View Convolutional Networks," IEEE Trans. on Medical Imaging, vol. 35, No. 5 (May 2016).

"LROC&FROC", retrieved from http://www.clg.niigatau.ac.jp/~medical/practice_medical_imaging/roc/3lfroc/index.htm on Jun. 28, 2016.

"Synapse (PACS)", retrieved from http://www.fujifilm.com/products/medical/synapse/ on Jun. 28, 2016.

Devinder Kumar, et al., "Discovery Radiomics for Computed Tomography Cancer Detection", arXiv:1509.00117 [cs.CV], Sep. 2015. {Retrieved from https://anciv.org/abs/1509.00117].

Mohammad Havaei, et. al., Brain Tumor Segmentation with Deep Neural Networks, arXiv:1505.03540 [cs.CV], May 2015. [Retrieved from https://arxiv.org/abs/1505.03540].

V.P. Gladis Pushap Rathi, et. al., "Brain Tumor Detection and Classification Using Deep Learning Classifier on MRI Images", Research Journal of Applie dSciences, Engineering and Technology 10(2), pp. 177-187, May 2015.

List of IBM Patents or Patent Applications Treated as Related, dated Nov. 12, 2019.

* cited by examiner

| | | | |
|---|---|---|---|
| 1 | 2.1D Image | Not Cancer | |
| ⋮ | ⋮ | ⋮ | |
| 1000 | 2.1D Image | Not Cancer | Group 1 |
| 1 | 2.1D Image | Cancer | |
| ⋮ | ⋮ | ⋮ | |
| 100 | 2.1D Image | Cancer | |
| 1001 | 2.1D Image | Not Cancer | |
| ⋮ | ⋮ | ⋮ | |
| 2000 | 2.1D Image | Not Cancer | Group 2 |
| 101 | 2.1D Image | Cancer | |
| ⋮ | ⋮ | ⋮ | |
| 200 | 2.1D Image | Cancer | |
| ⋮ | | | |
| 9001 | 2.1D Image | Not Cancer | |
| ⋮ | ⋮ | ⋮ | |
| 10000 | 2.1D Image | Not Cancer | Group 10 |
| 901 | 2.1D Image | Cancer | |
| ⋮ | ⋮ | ⋮ | |
| 1000 | 2.1D Image | Cancer | |

*FIG.5*

CASCADED NEURAL NETWORKS USING TEST OUPUT FROM THE FIRST NEURAL NETWORK TO TRAIN THE SECOND NEURAL NETWORK

BACKGROUND

Technical Field

The present invention relates to cascaded neural networks.

Related Art

Neural networks have been used for classifying images. For example, images of a biological organ can be processed by a neural network to find abnormalities (e.g., cancer). There is a need to improve the accuracy and efficiency of processing of the neural networks.

SUMMARY

According to a first aspect of the present invention, provided is a method comprising: training a first neural network using a first training dataset; inputting each test data of a first test dataset to the first neural network; calculating output data of the first neural network for each test data of the first test dataset; composing a second training dataset of training data from the first test dataset that causes the first neural network to output data within a first range; and training a second neural network using the second training dataset. The first aspect may also include a system implementing the method and a computer program product for performing the method.

The summary clause does not necessarily describe all features of the embodiments of the present invention. Embodiments of the present invention may also include sub-combinations of the features described above.

BRIEF DESCRIPTION OF THE DRAWINGS

FIG. 5 shows a plurality of groups according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
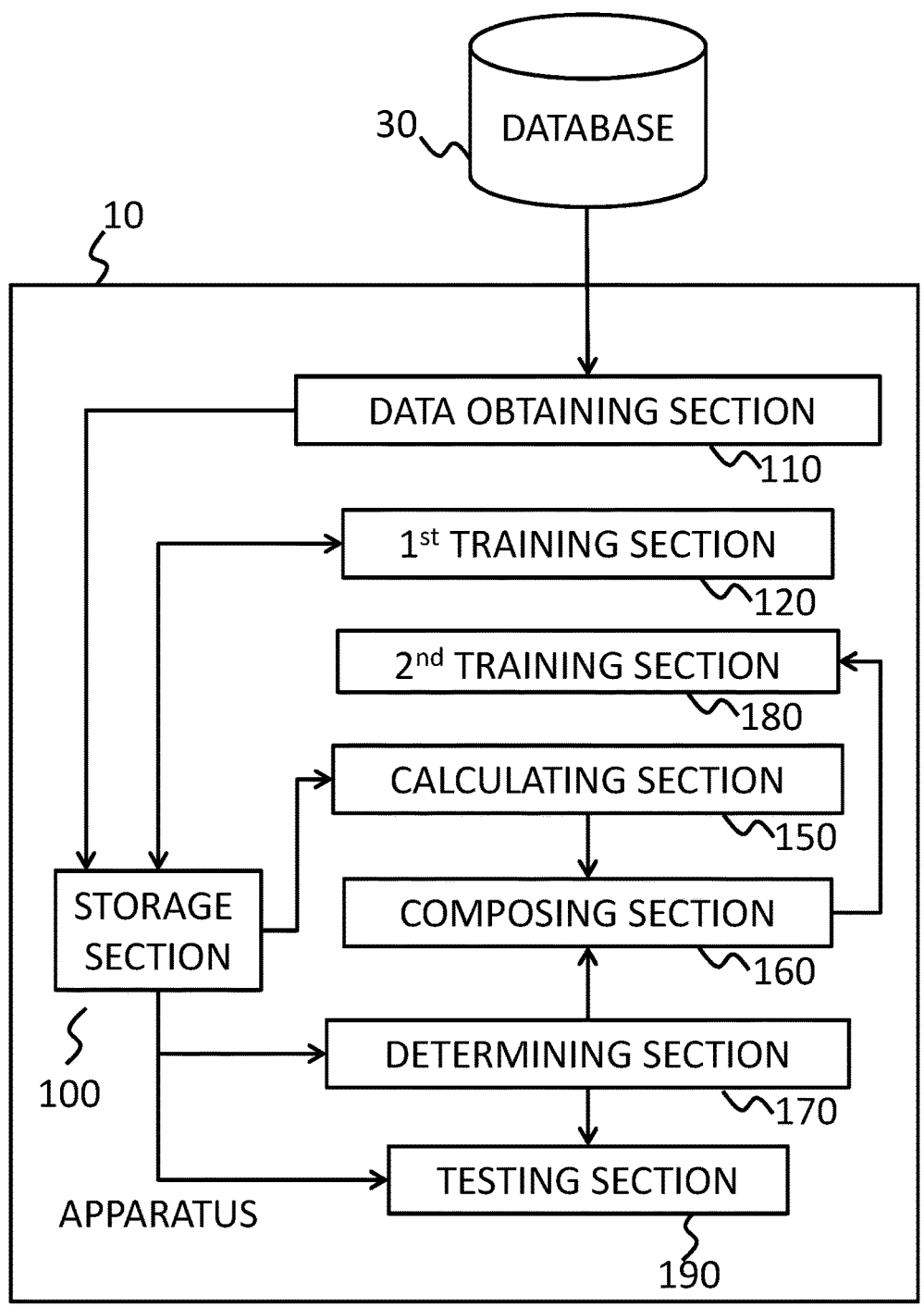
FIG. 1 shows an exemplary configuration of an apparatus, according to an embodiment of the present invention.

FIG. 1 shows an exemplary configuration of an apparatus 10, according to an embodiment of the present invention. The apparatus 10 may process a first neural network and a second neural network used for classifying data. In one embodiment, the apparatus 10 may be an image processing apparatus, and may train the first neural network and the second neural network to detect an abnormality from images of body tissue. The apparatus 10 may comprise a processor and one or more computer readable mediums collectively including instructions. The instructions, when executed by the processor, may cause the processor to operate as a plurality of operating sections. Thereby, the apparatus 10 may be regarded as comprising a storage section 100, a data obtaining section 110, a first training section 120, a calculating section 150, a composing section 160, a determining section 170, a second training section 180, and a testing section 190.

The storage section 100 may store information used for the processing that the apparatus 10 performs. In one embodiment, the storage section 100 may store weights trained for first neural network(s) and the second neural network(s). The storage section may be implemented by a volatile or non-volatile memory of the apparatus 10.

The data obtaining section 110 may obtain one or more of first training datasets and one or more of first test datasets from a database 30. In one embodiment, the data obtaining section 110 may obtain an initial training dataset from the database 30 and generate first training dataset(s) and first test dataset(s) based on the initial training dataset.

The first training dataset may include a plurality of training data, and the first test dataset may include a plurality of test data. Each training data in the first training data and each test data in the first test data may include an image and a classification of the image. The images of the first training dataset and the first test dataset may include a plurality of cross-sectional images of a body tissue. In one embodiment, the image may be an image captured by an image capturing apparatus (e.g., a CT image of a cross section of a lung). In one embodiment, the classification may include two or more of attributes. For example, the classification may be a judgement of existence or non-existence of abnormality of body tissue (e.g., cancer).

In the embodiment, each training data of the first training dataset and each test data of the first test dataset may include a set of an image of a portion of lung and the confirmed diagnosis of a cancer for the portion by medical doctor(s), or a set of an image of a portion of lung and the confirmed diagnosis of no cancer for the portion by medical doctor(s).

The data obtaining section 110 may further obtain a second test dataset including a plurality of test data. Each test data of the second test dataset may include a set of an image of a portion of lung and the confirmed diagnosis of a cancer for the portion, for example by medical doctor(s).

The data obtaining section 110 may further obtain a first target dataset including a plurality of target data from the database 30. Each target data may include an image that has not yet been classified. The data obtaining section 110 may store the obtained data into the storage section 100.

The first training section 120 may obtain the first training dataset from the storage section 100 and train a first neural network using the first training dataset. The first training section 120 may store the trained first neural network into the storage section 100.

The calculating section 150 may obtain the first neural network and the first test dataset from the storage section 100 and input each test data of the first test dataset to the first neural network. The calculating section 150 may calculate output data of the first neural network for each test data of the first test dataset.

The calculating section 150 may provide the composing section 160 with the first test dataset and the calculated output data thereof directly or via the storage section 100.

The composing section 160 may compose a second training dataset of training data from the first test dataset that causes the first neural network to output data within a first range. In one embodiment, the composing section 160 may identify one or more test data of the first test dataset that gives output data of the first neural network within the first range, and include the identified one or more test data in the second training dataset as training data. In one embodiment, the first range is a range on or above a threshold, and/or a range below a threshold. The composing section 160 may store the second training dataset into the storage section 100.

The determining section 170 may determine the threshold(s) used by the composing section 160, based on an average and a standard deviation of output data of the first neural network for the second test dataset. In one embodiment, the determining section 170 may input each test data of the second test dataset to the first neural network and calculate the output data of the second neural network for each test data of the second test dataset.

Then, the determining section 170 may calculate an average M and a standard deviation 6 of output data of the first neural network for the second test dataset, and determine one or more thresholds based on the result of the calculation. The determining section 170 may provide the composing section 160 and testing section 190 with the determined threshold(s) directly or via the storage section 100.

The second training section 180 may obtain the second training dataset from the storage section 100 and train a second neural network using the second training dataset. The second training section 180 may store the trained second neural network (e.g., weights between each node in a layer and each node in another layer in the second neural network) into the storage section 100. The details of training by the second neural network is explained below.

The testing section 190 may obtain the first neural network and the first target dataset from the storage section 100 and input each target data of the first target dataset to the first neural network. The testing section 190 may calculate output data of the first neural network for each target data of the first target dataset.

The testing section 190 may compose a second target dataset of target data from the first target dataset that causes the first neural network to output data within a second range. In one embodiment, the second range is a range on or above the threshold determined by the determining section 170, and/or a range below the threshold determined by the determining section 170. The second range may be the same as or not the same as the first range. Then, the testing section 190 may calculate output data of the second neural network for each target data of the second target dataset.

The testing section 190 may output the calculated output data of the second neural network. In one embodiment, the testing section 190 may display the output data on a display screen of the apparatus 10. In one embodiment, the output data may include a plurality of judgements of whether an image (e.g., an image of a portion of a lung) in each target data of the first target dataset indicates an existence of cancer or not.

Figure 2:
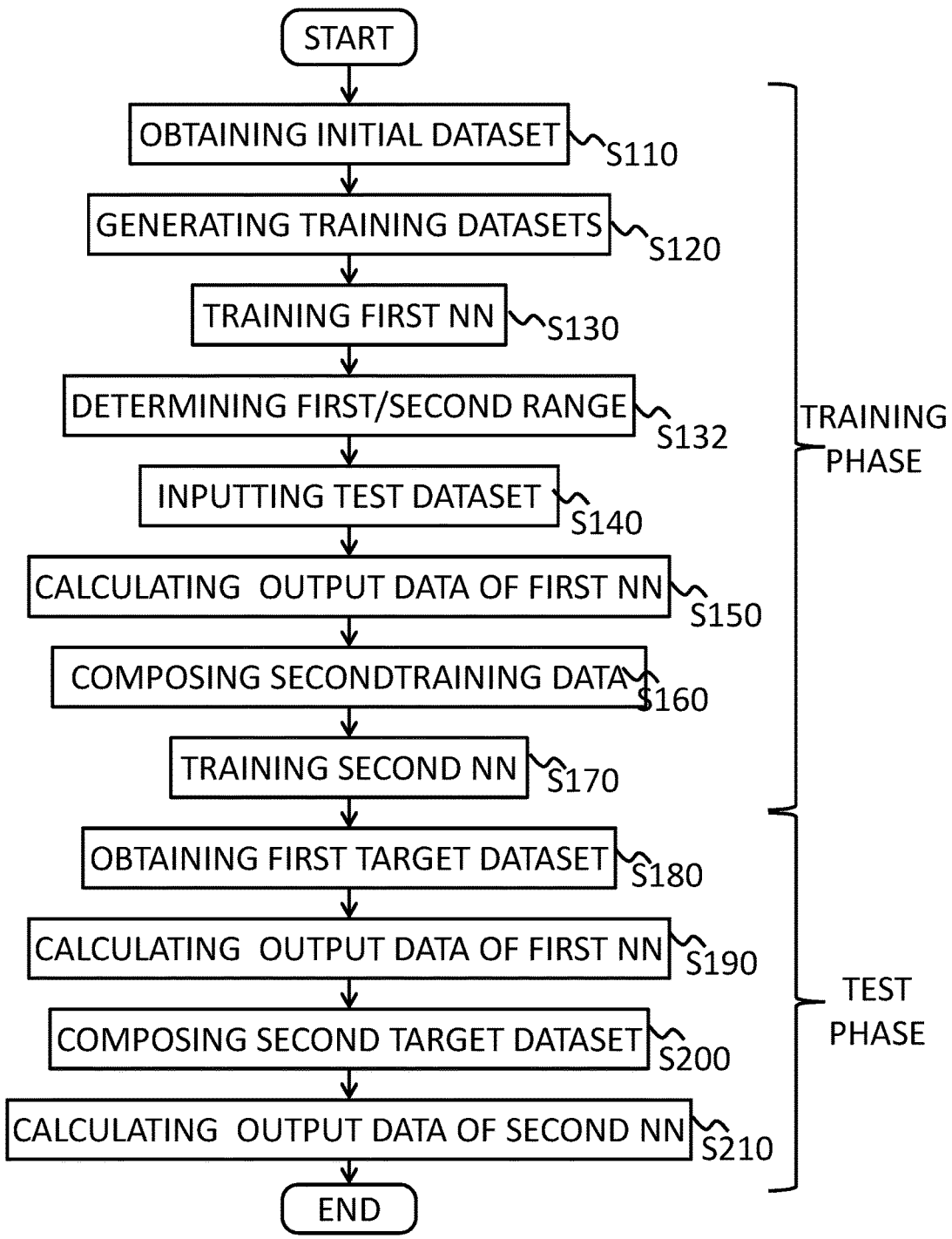
FIG. 2 shows an operational flow according to an embodiment of the present invention.

FIG. 2 shows an operational flow according to an embodiment of the present invention. The present embodiment describes an example in which an apparatus, such as the apparatus 100, performs the operations from S110 to 5210, as shown in FIG. 2. An apparatus, such as the apparatus 10, may perform a training phase throughout S110-S170, in which first neural network(s) and second neural network(s) are trained, and a test phase throughout S180-S210 in which a first target dataset is tested by the trained first neural network(s) and second neural network(s).

At S110, a data obtaining section such as the data obtaining section 110 may obtain an initial training dataset from a database such as the database 30. The initial training dataset includes a plurality of sets of an image and a classification of the image. The classification of the image may include a first attribute or a second attribute. The first attribute may represent that the image indicates normal status and the second attribute may represent that the image indicate abnormal status.

In one embodiment, the initial training dataset may include a plurality of images of a portion of lung, which is diagnosed as not including cancer, and therefore the first attribute is given to such images. In the embodiment, the initial training dataset may include a plurality of images of a portion of lung, which is diagnosed as including cancer, and therefore the second attribute is given to such images. Hereinafter, an embodiment where the classification includes two attributes the first neural network and the second neural network are binary classifiers, the first attribute being normal (e.g., not-cancer), and the second attribute being abnormal (e.g., cancer), is explained. However, other embodiments are not excluded. In some embodiments, the classification may include three or more of attributes and the first neural network and the second neural network are m-class classifier, where m is an integer above 2. In one embodiment, at least part of the initial training dataset of lung images may be obtained by a software program utilizing, for example, Lung Nodule Analysis 2016.

The potential cancer is a portion in body tissue where cancer is suspected. The potential cancer may actually be a cancer (or a tissue highly suspected as a cancer such as a nodule), or may be a normal organ (e.g., a blood vessel). The potential cancers may be identified from a lung image by a medical doctor (e.g., radiologists) or CAD software. The CAD software may utilize a combination of functions for calculating geometric features obtained from OpenCV.

In one embodiment, an image in a set of the initial training dataset may be a 2D image of a potential cancer. In the embodiment, the image of the potential cancer may be a portion of a whole lung image and have 64×64 pixels.

In another embodiment, an image in a set of the initial training dataset may be a 3D image (or a voxel image) of a potential cancer. In the embodiment, the 3D image of the potential cancer may have 64×64×64 pixels. In the embodiment, the 3D image (e.g., 512×512 pixels×300 slices) of a lung may be generated by an image capturing device (e.g., CT scanner) and then locations of the potential cancers in the 3D lung image may be identified by CAD software or a medical doctor. Then the 3D image of the potential cancers may be taken out from the whole 3D lung image.

In another embodiment, an image in a set of the initial training dataset may be a 2.1D image of a potential cancer. The 2.1D image is explained in relation to FIG. 3.

Figure 3:
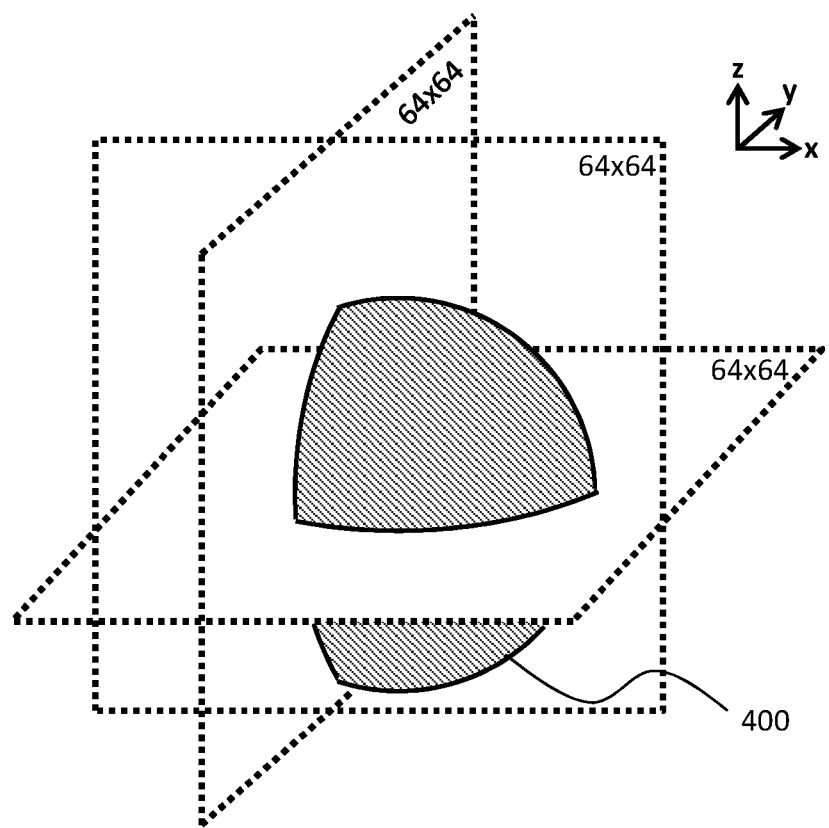
FIG. 3 shows a 2.1D image, according to an embodiment of the present invention.

FIG. 3 shows a 2.1D image, according to an embodiment of the present invention. A 2.1D image is a plurality of 2D images obtained from the 3D image of the potential cancer. FIG. 3 shows a potential cancer 400 having a ball-like shape. According to FIG. 3, the 3D image of the potential cancer 400 has 64×64×64 pixels. FIG. 3 shows that three 2D images each having 64×64 pixels are obtained by slicing the 3D image at 3 different planes (e.g., an x-y plane, an x-z plane, and a y-z plane). These three 2D images may be defined as a 2.1 D image. In other embodiments, the 2.1D image may have 2, 4, or more 2D images.

Locations at which the 3D image is sliced and the angles of slicing in the 2.1D images may be the same or different. In one embodiment, the initial training dataset may include a plurality of 2.1D images obtained by slicing a common 3D image by different locations and/or different angels, as sets of the initial training dataset. In one embodiment, when the data obtaining section determines that a whole potential cancer is not captured in predetermined image size (e.g., 64×64 pixels size), 3D image size (e.g., 64×64×64 pixels size), or 2.1D image size (e.g., 64×64 pixels size), then the data obtaining section may decrease the size of the image of the whole potential cancer so as to be captured by the predetermined size.

Figure 4:
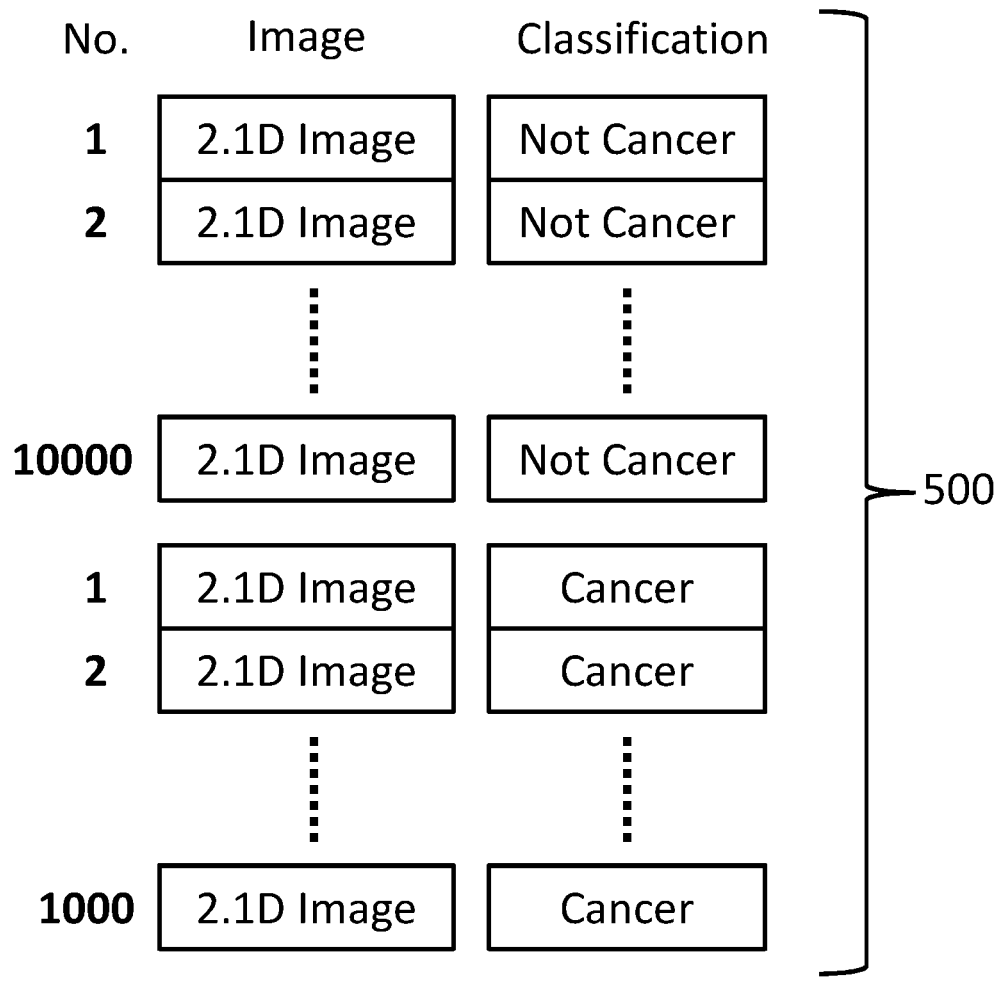
FIG. 4 shows an initial dataset according to an embodiment of the present invention.

FIG. 4 shows an initial dataset according to an embodiment of the present invention. In the embodiment of FIG. 4, the initial training dataset 500 may include ten-thousand 2.1D images of a portion of a lung that have been diagnosed as not including cancer by medical doctor(s) and one-thousand 2.1D images of a portion of a lung that have been diagnosed as including cancer by the medical doctor(s). Thereby in the embodiment, the number of sets in the initial training dataset 500 is 11000.

In some embodiments, the data obtaining section may increase the number of 2.1D images of cancer or 2.1D images of not-cancer by slicing 3D images of the same lungs at the different places for training. For example, when the data obtaining section can obtain a thousand 3D images of lungs, the data obtaining section may generate a thousand 2.1D images by slicing the thousand 3D images of lungs at 3 planes, and then generate an additional thousand of the 2.1D images by slicing the thousand 3D images of lungs at 3 different planes.

At S120, the data obtaining section may generate one or more first training datasets and one or more first training datasets from the initial training dataset. The data obtaining section may first divide the initial training dataset into a plurality of groups.

FIG. 5 shows a plurality of groups according to an embodiment of the present invention. As shown in the FIG. 5, the data obtaining section may divide the initial training dataset including 11000 sets of images into 10 groups. Each group includes a thousand 2.1D images diagnosed as not cancer and a hundred 2.1D images diagnosed as cancer.

In the embodiment of FIG. 5, a group 1 includes the 1-1000$^{th}$ 2.1D images diagnosed as not cancer and the 1-100$^{th}$ 2.1D images diagnosed as cancer, a group 2 includes the 1001-2000$^{th}$ 2.1D images diagnosed as not cancer and the 101-200$^{th}$ 2.1D images diagnosed as cancer, . . . , a group 10 includes the 9001-10000$^{th}$ 2.1D images diagnosed as not cancer and 901-1000$^{th}$ 2.1D images diagnosed as cancer.

The data obtaining section may generate the plurality of first training datasets and the plurality of first test datasets by allocating at least one group of the plurality of groups to each first training dataset and allocating the remaining group(s) of the plurality of groups to each first test dataset. The data obtaining section may allocate different combinations of groups among the plurality of groups to each first training dataset of the plurality of first training dataset.

Figure 6:
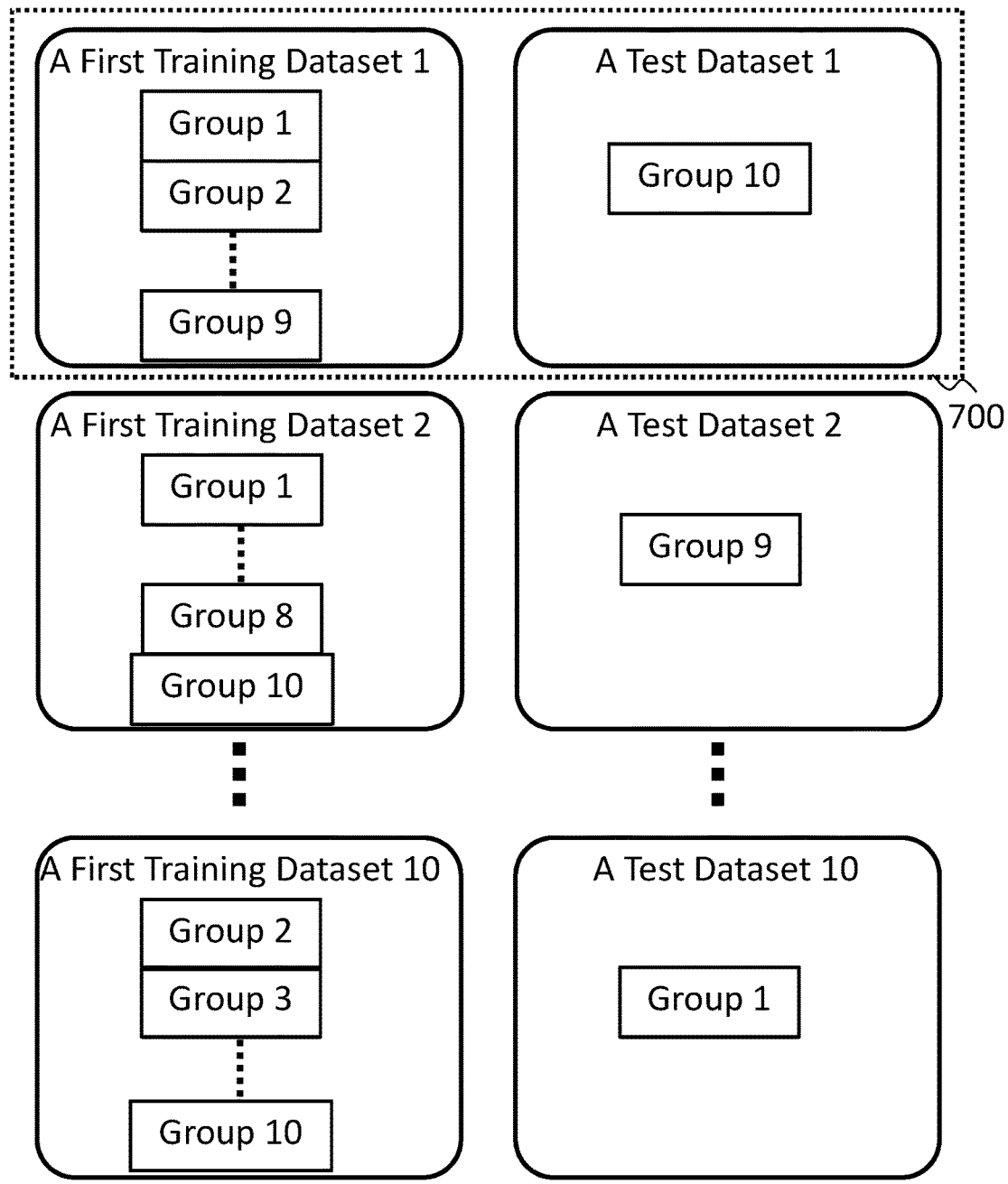
FIG. 6 shows a first training dataset and a first test dataset according to an embodiment of the present invention.

FIG. 6 shows a first training dataset and a first test dataset according to an embodiment of the present invention. In the embodiment of FIG. 6, the data obtaining section may generate 10 first training datasets and 10 first test datasets.

In the embodiment, the first training dataset 1 includes group 1, group 2, . . . , group 9, and the first test dataset 1 includes group 10. The first training dataset 2 includes group 1, group 2, . . . , group 8, group 10, and the first test dataset 2 includes group 9, . . . , the first training dataset 10 includes group 2, group 3, . . . , group 9, group 10, and the first test dataset 10 includes group 1.

As shown in FIG. 6, a plurality of pairs of a first training dataset and a first test dataset are formed. In the embodiment of FIG. 6, a pair 700 is formed by the first training dataset 1 and the first test dataset 1. In the embodiment of FIG. 6, the first test dataset in a pair is different from the first training dataset in the pair. In other embodiments, the first test dataset in a pair is at least partially the same as the first training dataset in the pair.

In other embodiments, the data obtaining section may randomly allocate groups to each first training dataset and first test dataset. In other embodiments, the data obtaining section may allocate the same or a larger number of groups to the first test dataset than the first training dataset.

In embodiments above, the first training dataset and the first test dataset may be derived from different body tissues. In other embodiments, at least a part of body tissues of the first training dataset are the same as the body tissues of the first test dataset. In the embodiments, the images of the first test dataset are obtained by slicing a body tissue of the images of the first training dataset at a plurality of cross-sections that are different than the cross-sections of the images of the first training dataset.

In the embodiments above, the number of training data having the first attribute (e.g., not cancer) and the number of training data having the second attribute (e.g., cancer) in the first training dataset may be extremely imbalanced. In the embodiments, the latter number is larger than the latter number by ten times.

In one embodiment, the number of training data having one attribute in the first training dataset may be 4 times or more larger than the number of training data having other attribute(s). With such imbalanced first training dataset, the apparatus may train the first neural network so as to detect data having one attribute from dataset comprising data having the first attribute and data having the other attribute(s), more accurately than with balanced training dataset.

Meanwhile, in the embodiments above, the number of test data having the first attribute and the number of test data having the second attribute in the first test dataset may be balanced. In the embodiments, the latter number may be the same or almost the same as the former number. For example, the data obtaining section may increase the number of test data having the second attribute by adding images that are made by randomly rotating, expanding, and/or shrinking the image of existing test data having the second attribute in the first test dataset.

With such balanced first test dataset, the apparatus may train the second neural network so as to improve comprehensive classification ability of the second neural network.

The data obtaining section may obtain a second test dataset. The second test dataset may include a plurality of test data. Each test data of the second test dataset may include a set of an image having a second attribute. In one embodiment, the test data of the second test dataset may include an image of a portion of a lung and the confirmed diagnosis of a cancer for the portion by medical doctor(s).

The second test dataset may include a part of one or more of the first training dataset(s) or one or more of the first test dataset. In one embodiment, the second test dataset may be the same as a part of the initial training dataset having the second attribute (i.e., the images of potential cancer diagnosed as cancer). In other embodiments, the data obtaining section may obtain a new test dataset different from the initial training dataset from the database. The data obtaining section may store the first training dataset(s), the first test dataset(s) and the second test dataset into a storage section such as the storage section 100.

At S130, a first training section such as the first training section 120 may train a first neural network using the first training dataset. In one embodiment, the first training section may determine weights between each node in a layer and each node in another layer in the first neural network. In one embodiment, the first training section may determine the weights by performing back propagation. In one embodiment, the first neural network may be a convolutional neural network.

In one embodiment, the first neural network may be a binary classifier and input an image (e.g., 2.1D image) and output a certainty factor with which the image (e.g., an image of potential cancer) is classified as an abnormal (e.g., a cancer). The certainty factor may have a value between 0-1. The values closer to 1 indicate a greater degree or higher probability of abnormality and values closer to 0 indicate normalcy.

In one embodiment, the first training section may train each first neural network of the plurality of first neural networks by using a respective first training dataset of a plurality of the first training datasets. In the embodiment, the first training section may train a first neural network 1 by using the first training dataset 1, a first neural network 2 by using the first training dataset 2, . . . , a first neural network 10 by using the first training dataset 10. The first training section may store the trained first neural network(s) (e.g., the first 10 neural networks) in the storage section.

At S132, a determining section such as the determining section 170 may determine a first range and a second range. The first range and the second range may relate to a scale of certainty factor, of which a test data and a target data is applied to the second neural network.

In one embodiment, the determining section may calculate an average M and a standard deviation σ of output data (e.g., certainty factor) of the first neural network for the second test dataset. In the embodiment, the determining section may determine a value of the average minus 2 standard deviations (M−2σ), (M−σ), σ, or 2σ as one or more of thresholds defining an upper limit and/or a lower limit of the first range and/or the second range. For example, the first range is a range above (M−2σ) and the second range is a range above (M−2σ). The determining section may store the threshold(s) in the storage section.

At S140, a calculating section such as the calculating section 150 may input each test data of the first test dataset to the first neural network. In one embodiment, the calculating section may input each test data of the first test dataset in a pair to the first neural network trained by the first training dataset in the pair.

For example, the calculating section may input each test data of the first test dataset 1 to the first neural network 1, each test data of the first test dataset 2 to the first neural network 2, . . . , each test data of the first test dataset 10 to the first neural network 10.

At S150, the calculating section may calculate output data of the first neural network for each test data of the first test dataset. In one embodiment, the calculating section may calculate output data of the first neural network trained by the first training dataset in a pair, for each test data of the first test dataset in the pair.

For example, the calculating section may calculate output data of the first neural network 1 for each test data of the first test dataset 1, output data of the first neural network 2 for each test data of the first test dataset 2, . . . , output data of the first neural network 10 for each test data of the first test dataset 10. The calculating section may provide a composing section, such as the composing section 160, with the first test dataset and the calculated output data thereof directly or via the storage section.

At S160, the composing section may compose a second training dataset of training data from the first test dataset that causes the first neural network to output data within a first range. The composing section may identify one or more test data of the first test dataset that gives output data of the first neural network within the first range among the plurality of test data of the first test dataset. The composing section may include the test data identified in the first test dataset in the second training dataset as training data.

In one embodiment, the composing section may compose a plurality of second training datasets of training data from the plurality of the first test datasets. In the embodiment, the composing section may compose a second training dataset 1 from the first test dataset 1, a second training dataset 2 from the first test dataset 2, . . . , a second training dataset 10 from the first test dataset 10. The composing section may store the second training dataset(s) in the storage section.

At S170, a second training section, such as the second training section 180, may obtain the second training dataset from the storage section and train a second neural network using the second training dataset. In one embodiment, the second training section may determine weights between each node in a layer and each node in another layer in the second neural network. In one embodiment, the second training section may determine the weights by performing back propagation. In one embodiment, the second neural network may be a convolutional neural network.

In one embodiment, the second neural network may be a binary classifier and input an image (e.g., 2.1D image) and output a classification as to whether the image is classified as abnormal or not (e.g., cancer or not cancer). In other embodiments, the second neural network may output a certainty factor with which the image (e.g., an image of potential cancer) is classified as an abnormal (e.g., a cancer), similar to the first neural network.

In one embodiment, the second training section may train each second network of a plurality of the second neural networks by using a respective second training dataset of a plurality of the second training datasets. In the embodiment, the second training section may train a second neural network 1 by using the second training dataset 1, a second neural network 2 by using the second training dataset 2, . . . , a second neural network 10 by using the second training dataset 10. The second training section may store the trained second neural network(s) in the storage section.

At S180, the data obtaining section may obtain a first target dataset including a plurality of target data from the database. The target data in the first target dataset may include an image (e.g., 2D, 2.1D, or 3D image) of the potential cancer. The data obtaining section may store the obtained data in the storage section.

At S190, a testing section, such as the testing section 190, may obtain the first neural network and the first target dataset from the storage section and input each target data of the first target dataset to the first neural network. The testing section may calculate output data of the first neural network for each target data of the first target dataset.

In one embodiment, the testing section may calculate a plurality of output data from the plurality of first neural networks, for each target data of the first target dataset. For example, the testing section may calculate output data of the first neural network 1 for each target data of the first target dataset, output data of the first neural network 2 for each target data of the first target dataset, . . . , output data of the first neural network 10 for each target data of the first target dataset.

At S200, the testing section may compose a second target dataset of target data from the first target dataset that causes the first neural network to output data within a second range. The testing section may compose the second target dataset of target data based on the output data from the plurality of the first neural networks for the first target dataset.

In one embodiment, the testing section may calculate an average of the plurality of output data of the plurality of the first neural networks (e.g., the first neural network 1, the first neural network 2, . . . , the first neural network 10), identify one or more of target data of the first target dataset that gives the average of the plurality of output data (10 output data) within the second range, and include the identified one or more of target data in the second target dataset.

In other embodiments, the testing section may identify one or more target data of the first target dataset that gives the predetermined number (e.g., ½, ¾, or all of the number of the first neural networks) of output data within the second range, and includes the identified one or more target data in the second target dataset.

In one embodiment, the second range may be same as the first range used by the composing section at S160. In other embodiments, the second range may be different from the first range. For example, the first range is a range on or above a first threshold, and the second range is a range on or above a second threshold larger than the first threshold.

Next at S210, the testing section may calculate output data of the second neural network for each target data of the second target dataset. The testing section may calculate a plurality of output data of the plurality of second neural networks, for each target data of the second target dataset. For example, the testing section may calculate output data of the second neural network 1 for each target data of the second target dataset, output data of the second neural network 2 for each target data of the second target dataset, . . . , output data of the second neural network 10 for each target data of the second target dataset.

The testing section may determine a final result based on the plurality of output data from the second neural network. In one embodiment, the testing section may determine the final result based on majority vote. In the embodiment, when more than half (or predetermined threshold number) of output data of the plurality of second neural networks (e.g., 6 second neural networks) for a target data indicates cancer, then the testing section may output data indicating that an image of the target data includes a cancer as the final result, and when less than or an equal number of half (or the predetermined threshold number) of output data of the plurality of second neural networks (e.g., 4 second neural networks) for a target data indicates cancer, then the testing section may output data indicating that an image of the target data does not include a cancer as the final result.

Alternatively, in one embodiment, the testing section may output the calculated plurality of output data of the plurality of second neural networks, for each target data of the second target dataset. In the embodiment, the testing section may output a value of certainty factor and an image for each target data of the second target dataset. The testing section may not output the value of certainty factor and the image for each target data of the second target dataset when the value of certainty factor is below a threshold.

The first target dataset includes a plurality of images of a body tissue (e.g., lung). In one embodiment, all images of the first target dataset are captured by different body tissues. In other embodiments, some images of the first target dataset may be captured by the same body tissue but have at least one of a different coverage, different angle, and different magnification ratio. In the embodiments, the testing section may obtain a plurality of output data from the first neural network for the same body tissue, and the testing section may adopt the highest output data (e.g., output data having the highest certainty factor) as the output for the body tissue.

In the embodiments above, the apparatus mainly processes an image of a lung as part of a training data, a test data, and a target data. However, the training data, the test data, and the target data may be images of the body tissue such as cross-sectional images of other body tissue. The image used as a part of a training data, a test data and a target data can be exemplified by an image obtained by performing at least one of X-ray imaging, CT (Computed Tomography), MRI (Magnetic Resonance Imaging), PET (Positron Emission Tomography), and the like on the brain, lungs, liver, digestive tissue, or other organ or tissue of a human or animal As another example, the image of the body tissue may include an image obtained by imaging the surface of the body tissue with a camera.

The abnormality of body tissue may include an abnormal shape distinguishable from healthy body tissue and caused by unstable functioning, a current disease (e.g. a malignant tumor), or the like of the body tissue, and/or an abnormal shape that is a precursor to or cause of a future disease of the body tissue.

In many embodiments, the apparatus trains and uses two types of neural networks (i.e., the first neural networks and the second neural networks). In other embodiments, the apparatus may train and use three or more types of neural networks. In such embodiments, training data, test data and/or target data filtered by neural networks may be used for the next neural networks.

Figure 7:
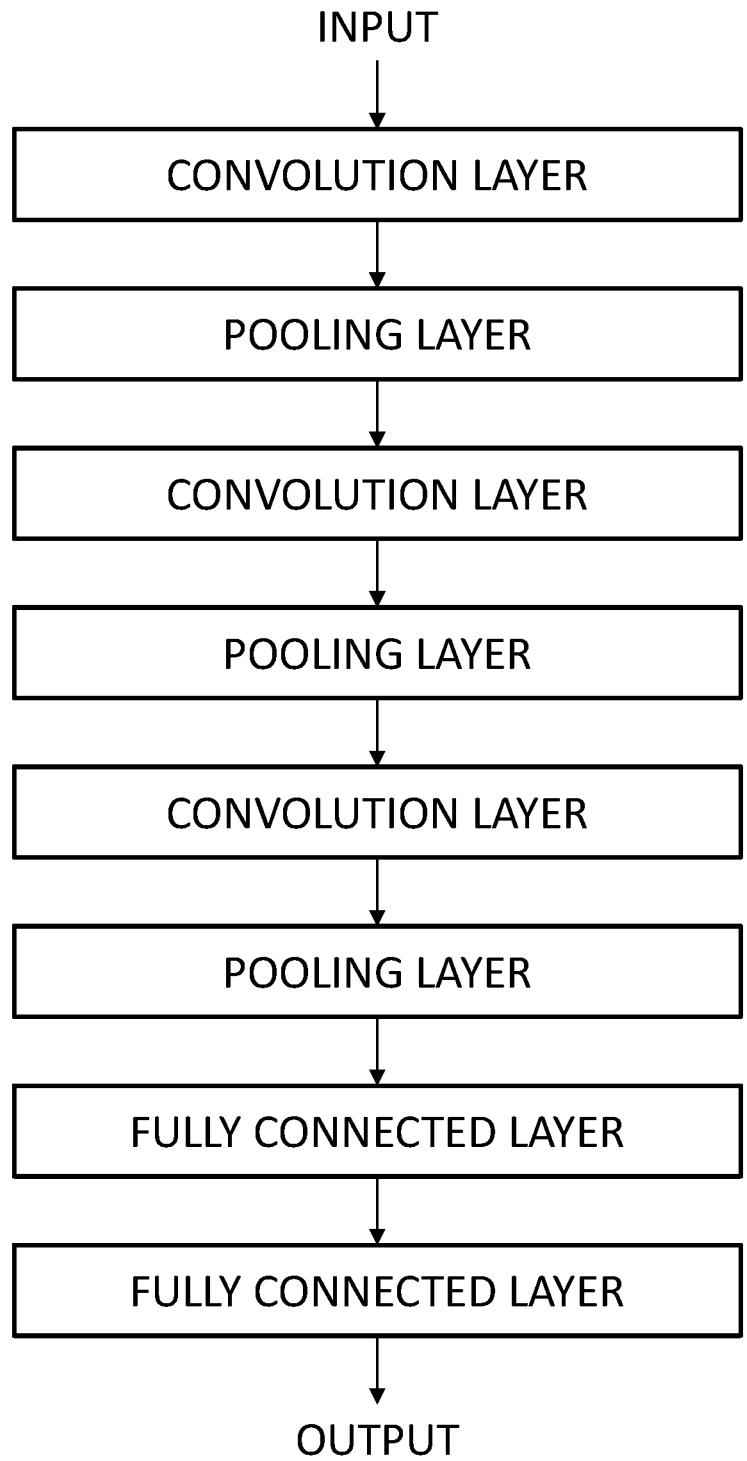
FIG. 7 shows an exemplary layer structure of the neural network according to an embodiment of the present invention.

FIG. 7 shows an exemplary layer structure of the neural network according to an embodiment of the present invention. The first neural network(s) and the second neural network(s) may be represented by the structure of FIG. 7. As shown in the drawing, the neural network may include a plurality (e.g., three) of groups of convolution layers and pooling layers, and two fully connected layers. The convolution layers may be layers that perform convolution by performing a filtering process on the input, and may include a plurality of neurons corresponding to the plurality of filters. The pooling layers may be layers that apply a rectangular filter for extracting a maximum value to the input, and may include a plurality of neurons corresponding to the plurality of rectangular filters. The fully connected layer may include a plurality of layers that each have a plurality of neurons, and the neurons may be connected to each other between each layer.

The resultant output from the lowest pooling layer may be input to a plurality (e.g., two) of fully connected layers. The output result from the fully connected layer may be output as the output of the neural network. In one embodiment, the first training section and the second training section may train at least some weights between nodes in the convolution layers, the pooling layers, and the fully connected layers.

As explained above, through the training phrase, the apparatus may first train the first neural network, and then train the second neural network using the training data (or the test data) filtered by the first neural network. In other words, the first neural network and the second neural network may be cascaded. Thereby the first neural network and the second neural networks may be independently optimized for different purposes. For example, the first neural network may be optimized so as to classify images of potential cancers, into (A) images of benign tissue (e.g., blood vessels), and (B) images of cancer and images of benign tissue confusable with cancer while minimizing cutoff of images of cancers. For example, the second neural network may be optimized so as to pick up images of cancer from images including confusing images. Thus, the apparatus may improve the determination of attributes of datasets. For example, the apparatus may improve accuracy of finding images of cancers from the potential cancers and reduce the burden of judgement of abnormality of body tissue by medical doctors. By cascading the neural network, computational resource consumption is reduced over prior neural networks.

Figure 8:
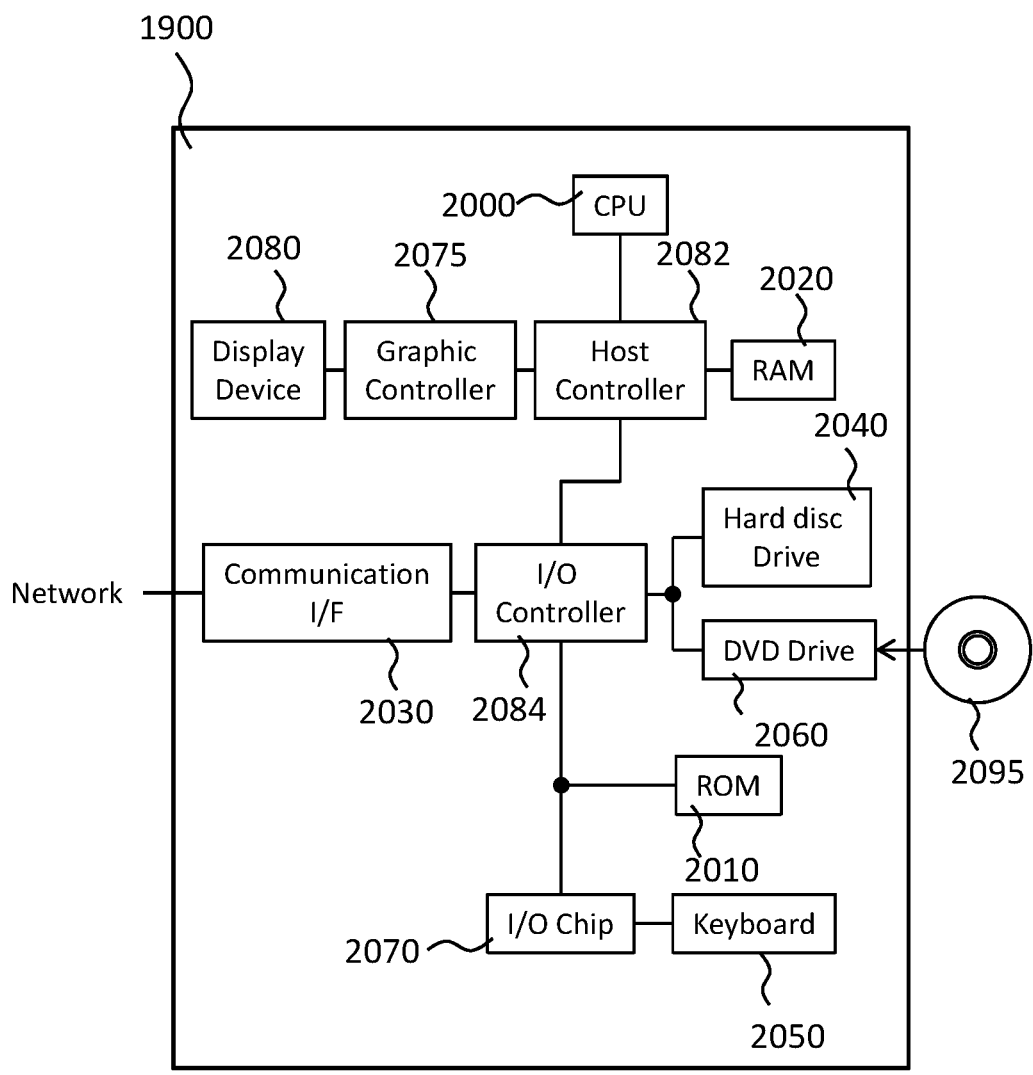
FIG. 8 shows an exemplary hardware configuration of a computer that functions as a system, according to an embodiment of the present invention.

FIG. 8 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as apparatus 10 of FIG. 1. The program or module acts on the CPU 2000, to cause the computer 1900 to function as a storage section, a data obtaining section, a first training section, a calculating section, a composing section, a determining section, a second training section, and a testing section, such as the storage section 100, the data obtaining section 110, the first training section 120, the calculating section 150, the composing section 160, the determining section 170, the second training section 180, and the testing section 190 described above.

The information processing described in these programs is read into the computer 1900, to function as a storage section, a data obtaining section, a first training section, a calculating section, a composing section, a determining section, a second training section, and a testing section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method, implemented by a computer, comprising:
    training a first neural network using a first training dataset;
    inputting each test data of a first test dataset to the first neural network;
    calculating output data of the first neural network for each test data of the first test dataset;
    composing a second training dataset of training data from the first test dataset that causes the first neural network to output data within a first range; and
    training a second neural network using the second training dataset.

2. The method of claim 1, wherein the first test dataset is the same as the first training dataset.

3. The method of claim 1, wherein the first test dataset is different from the first training dataset.

4. The method of claim 1, wherein
    the training of the first network comprises training each first neural network of a plurality of first neural networks by using a respective first training dataset of a plurality of the first training datasets, and
    the training of the second neural network comprises training each second network of a plurality of the second neural networks by using a respective second training dataset of a plurality of the second training datasets.

5. The method of claim 4, further comprising:
    obtaining an initial training dataset;
    dividing the initial training dataset into a plurality of groups; and
    generating the plurality of first training datasets by allocating at least one group to each first training dataset, wherein different combinations of groups among the plurality of groups are allocated to each first training dataset.

6. The method of claim 1, wherein the first range is a range on or above a threshold.

7. The method of claim 6, further comprising:
    inputting each test data of a second test dataset to the first neural network; and
    determining the threshold based on an average and a standard deviation of output data of the first neural network for the second test dataset.

8. The method of claim 1, wherein the first range is a range below a threshold.

9. The method of claim 1, wherein each training data of the first training dataset and each test data of the first test dataset includes an image and a classification of the image.

10. The method of claim 9, wherein the classification of the image includes a first attribute and a second attribute, and
    wherein the number of training data having the second attribute is at least 4 times larger than the number of training data having the first attribute in the first training dataset.

11. The method of claim 10, wherein the images of the first training dataset include a plurality of cross-sectional images of a body tissue.

12. The method of claim 11, wherein the images of the first test dataset are obtained by slicing a body tissue of the images of the first training dataset at a plurality of cross-sections that are different than the cross-sections of the images of the first training dataset.

13. The method of claim 1, further comprising:
    inputting each target data of a first target dataset to the first neural network; and
    calculating output data of the first neural network for each target data of the first target dataset.

14. The method of claim 13, further comprising:
    composing a second target dataset of target data from the first target dataset that causes the first neural network to output data within a second range; and
    calculating output data of the second neural network for each target data of the second target dataset.

15. The method of claim 14, further comprising:
    adopting highest output data of the first neural network for an image of the first target dataset;

wherein the first target dataset includes a plurality of images of a body tissue, the plurality of images having at least one of a different coverage, different angle, and different magnification ratio.

16. A system, comprising:

a processor; and one or more computer readable mediums collectively including instructions that, when executed by the processor, cause the processor to:

train a first neural network using a first training dataset, input each test data of a first test dataset to the first neural network, calculate output data of the first neural network for each test data of the first test dataset, compose a second training dataset of training data from the first test dataset that causes the first neural network to output data within a first range, and train a second neural network using the second training dataset.

17. The system of claim 16, wherein the first test dataset is the same as the first training dataset.

18. The system of claim 16, wherein the first test dataset is different from the first training dataset.

19. A computer program product comprising a computer readable storage medium having program instructions embodied therewith, the program instructions executable by a computer to cause the computer to perform operations comprising:

training a first neural network using a first training dataset;

inputting each test data of a first test dataset to the first neural network;

calculating output data of the first neural network for each test data of the first test dataset;

composing a second training dataset of training data from the first test dataset that causes the first neural network to output data within a first range; and training a second neural network using the second training dataset.

20. The apparatus of claim 16, wherein the first test dataset is the same as the first training dataset.

* * * * *